(12) United States Patent
Chen et al.

(10) Patent No.: US 7,890,479 B2
(45) Date of Patent: *Feb. 15, 2011

(54) EFFICIENT XML SCHEMA VALIDATION OF XML FRAGMENTS USING ANNOTATED AUTOMATON ENCODING

(75) Inventors: Yao-Ching Stephen Chen, San Jose, CA (US); Fen-Ling Lin, San Jose, CA (US); Ning Wang, Irvine, CA (US); Guogen Zhang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 344 days.

This patent is subject to a terminal disclaimer.

(21) Appl. No.: 12/197,592

(22) Filed: Aug. 25, 2008

(65) Prior Publication Data

US 2008/0313234 A1    Dec. 18, 2008

Related U.S. Application Data

(63) Continuation of application No. 10/774,594, filed on Feb. 10, 2004, now Pat. No. 7,437,374.

(51) Int. Cl.
*G06F 17/30* (2006.01)

(52) U.S. Cl. ...................................................... 707/701

(58) Field of Classification Search .................. 707/701
See application file for complete search history.

(56) References Cited

U.S. PATENT DOCUMENTS 4,864,502 A    9/1989    Kucera et al.

(Continued)

FOREIGN PATENT DOCUMENTS

JP        2001-67348       3/2001

(Continued)

OTHER PUBLICATIONS

Bouchou et al., "Extending Tree Automata to Model XML Validation Under Element and Attribute Constraints," doc. modified Mar. 23, 2003, accessed Nov. 16, 2007, avail. online, p. 184-90.

(Continued)

*Primary Examiner*—Neveen Abel Jalil
*Assistant Examiner*—Mark Andrew X Radtke
(74) *Attorney, Agent, or Firm*—IP Authority, LLC; Ramraj Soundararajan

(57) ABSTRACT

An XML schema is compiled into an annotated automaton encoding, which includes a parsing table for structural information and annotation for type information. The representation is extended to include a mapping from schema types to states in a parsing table. To validate a fragment against a schema type, it is necessary simply to determine the state corresponding to the schema type, and start the validation process from that state. When the process returns to the state, fragment validation has reached successful completion. This approach is more efficient than a general tree representation. Only the data representation of the schema information is handled, making it much easier than manipulating validation parser code generated by a parser generator. In addition, only one representation is needed for schema information for both document and fragment validation. This approach also provides a basis for incremental validation after update.

10 Claims, 14 Drawing Sheets

U.S. PATENT DOCUMENTS

| | | | |
|---|---|---|---|
| 6,101,512 | A | 8/2000 | DeRose et al. |
| 6,353,896 | B1 | 3/2002 | Holzmann et al. |
| 6,418,446 | B1 | 7/2002 | Lection et al. |
| 6,480,865 | B1 | 11/2002 | Lee et al. |
| 6,519,617 | B1 | 2/2003 | Wanderski et al. |
| 6,549,221 | B1 | 4/2003 | Brown et al. |
| 6,591,260 | B1 | 7/2003 | Schwarzhoff et al. |
| 6,598,015 | B1 | 7/2003 | Peterson et al. |
| 6,598,219 | B1 | 7/2003 | Lau |
| 6,601,075 | B1 | 7/2003 | Huang et al. |
| 6,604,099 | B1 | 8/2003 | Chung et al. |
| 6,643,652 | B2 | 11/2003 | Helgeson et al. |
| 6,675,355 | B1 | 1/2004 | Demopoulos et al. |
| 6,799,194 | B2 | 9/2004 | Grosz et al. |
| 6,966,027 | B1 | 11/2005 | Krasinski |
| 7,055,093 | B2 | 5/2006 | Tozawa et al. |
| 7,165,216 | B2 | 1/2007 | Chidlovskii et al. |
| 2001/0054172 | A1 | 12/2001 | Tuatini |
| 2002/0019824 | A1 | 2/2002 | Holder et al. |
| 2002/0019837 | A1 | 2/2002 | Balnaves |
| 2002/0073091 | A1 | 6/2002 | Jain et al. |
| 2002/0078406 | A1 | 6/2002 | Kondoh et al. |
| 2002/0087571 | A1 | 7/2002 | Stapel et al. |
| 2002/0099738 | A1 | 7/2002 | Grant |
| 2002/0129059 | A1 | 9/2002 | Eck |
| 2002/0138517 | A1 | 9/2002 | Mory et al. |
| 2002/0157023 | A1 | 10/2002 | Callahan et al. |
| 2002/0169565 | A1 | 11/2002 | Westbrook et al. |
| 2002/0184401 | A1 | 12/2002 | Kadel, Jr. et al. |
| 2003/0005001 | A1 | 1/2003 | Kataoka |
| 2003/0046317 | A1 | 3/2003 | Cseri et al. |
| 2003/0070158 | A1 | 4/2003 | Lucas et al. |
| 2003/0093402 | A1 | 5/2003 | Upton |
| 2003/0110279 | A1 | 6/2003 | Banerjee et al. |
| 2003/0110311 | A1 | 6/2003 | Kumar |
| 2003/0115548 | A1 | 6/2003 | Melgar |
| 2003/0154444 | A1 | 8/2003 | Tozawa et al. |
| 2003/0163603 | A1 | 8/2003 | Fry et al. |
| 2003/0182452 | A1 | 9/2003 | Upton |
| 2004/0006741 | A1 | 1/2004 | Radja et al. |
| 2004/0073870 | A1 | 4/2004 | Fuh et al. |
| 2005/0060645 | A1 | 3/2005 | Raghavachari et al. |
| 2005/0086584 | A1 | 4/2005 | Sampathkumar et al. |
| 2005/0177543 | A1 | 8/2005 | Chen et al. |

FOREIGN PATENT DOCUMENTS

| | | |
|---|---|---|
| JP | 2003-150442 | 5/2003 |
| WO | WO01/14951 | 3/2001 |
| WO | WO02/50691 | 6/2002 |

OTHER PUBLICATIONS

Shanmugasundaram et al., "Efficiently Publishing Relational Data as XML Documents," VLDB Journal, 2001, pp. 133-154.

Wang et al., "An XML Typing Module for XML Schema Validation and XML Typing," Association for Computing Machinery, Inc., 2003, 8pgs.

Feng et al., "Design and Implementation of the Extensible Markup Language Parser," Journal of Xi'AN Jiaotong University, V36,N8,Aug. 2002, pp. 1, 868-70.

Nelson, "Validation with MSXML and XML Schema," pp. 1-4.

Cooper, "What is Expat?" XML.com, Sep. 1999, 19pgs.

Franz et al., "An Efficient XML Schema Typing System," Nov. 2003, pp. 1-20.

Sun Microsystems, Java Architecture for XML Binding (JAXB), Jan. 2003, pp. 1-11.

"The Java Architecture for XML Binding User's Guide," May 2001, Revision 01, Sun Microsystems, Inc., pp. 1-80.

Lerner, Barbara, "A Model for Compound Type Changes Encountered in Schema Evolution," ACM Transactions on Database Systems, Mar. 2000, V25, N1, pp. 83-127.

```
<personnel>:= PS <employee> PE

<employee>:= <employee>

<employee>:= <employees> <employee>

<employee>:= ES <lastname> <firstname> <notes_01> EE

<lastname> := LS LE

<firstname> := FS FE

<notes>    := NS NE

<notes_01> := epsilon | <notes>
```

FIG. 2

| TYPE 400 | ELEMENT NAME 402 | SCHEMA CONTEXT PATH 404 |
|---|---|---|
| <personnel> | personnel | global (408) |
| <employee> | employee | p:personnel (410) |
| <lastname> | lastname | p:personnel/employee (412) |
| <firstname> | firstname | p:personnel/employee (414) |
| <notes> | notes | global or p:personnel/employee (416, 418) |

FIG. 4

EFFICIENT XML SCHEMA VALIDATION OF XML FRAGMENTS USING ANNOTATED AUTOMATON ENCODING

RELATED APPLICATIONS

This application is a continuation of U.S. application Ser. No. 10/774,594, filed Feb. 10, 2004, pending.

BACKGROUND OF THE INVENTION

1. Related Applications

This application is related to pending U.S. application Ser. No. 10/418,658, filed Apr. 16, 2003, entitled, "Annotated Automaton Encoding of XML Schema for High Performance Schema Validation," which claims benefit of U.S. Provisional Application 60/418,673, filed Oct. 15, 2002, and is hereby incorporated by reference in its entirety, including any appendices and references thereto.

2. Field of Invention

The present invention relates generally to the field of extensible mark-up language (XML) schema validation. More specifically, the present invention is related to XML schema validation of XML document fragments.

3. Discussion of Prior Art

Extensible mark-up language (XML) schemas allow users to define complex structured XML data objects with strong typing, thus facilitating the widespread use of the XML language in data storage and data processing. As each XML document is offered, it must be validated against its XML schema definition to ensure validity prior to its usage. XML schema validation of XML document fragments plays a critical role in query languages, such as supporting the "IS VALID" operator in SQL/XML and the validate expression, and checking the validity of XML data constructed in XQuery. It is also the basis for incremental validation after document update—validating a document or fragment after an update without re-validating an entire XML document. This is performance critical especially when maintaining a large XML document or fragment.

A first existing technique for XML schema validation represents structural and type information from an XML schema in a tree format. In this approach, the parser receives an XML schema definition and the XML document as input, parses the XML document into a tree format, parses the XML schema definition into a schema tree format, and then traverses the XML document tree to check it against the XML schema tree. The same general-purpose schema validation parser is used for many different XML schemas. Although this technique is flexible in that it can validate against many different XML schemas, it is often slow, and sometimes requires traversal beginning at the root of a data tree.

A second existing technique is to generate XML schema validation parser code based on a particular XML schema definition. However, this approach is inflexible in that each XML schema validation parser can only validate against a particular XML schema. It is also necessary to point out that a parser generator approach generating custom validating parser code has difficulty meeting the requirements for fragment validation. To validate a fragment, it is necessary to find code or a routine entry corresponding to a schema component "to jump" or "call to" and to isolate such code from the validation parser code. These processes are not trivial. Alternatively, if one small validation parser were generated for each possible fragment, the number of the parsers would increase too rapidly to be implemented in practice.

Whatever the precise merits, features, and advantages of the above cited references, none of them achieves or fulfills the purposes of the present invention. Therefore, there is a need for an efficient and easily manageable approach to XML fragment validation.

SUMMARY OF THE INVENTION

A method for XML schema validation of XML documents or fragments is comprised of loading an XML document or fragment into a runtime validation engine, where a runtime validation engine comprises an XML schema validation parser; loading an annotated automaton encoding (AAE) for an XML schema definition into an XML schema validation parser; and validating an XML document or fragment against a corresponding XML schema definition using an XML schema validation parser utilizing an annotated automaton encoding. Rather than being compiled each time an XML document or fragment is validated, each XML schema definition is compiled once into an AAE format. Thus, significant time is saved. Code for a runtime validation engine is fixed and does not vary depending on the XML schema definition. Thus, space overhead is minimized and only one representation is needed for schema information for both document and fragment validation. The present invention also provides a basis for incremental validation after update.

An XML schema is compiled into an AAE, which includes a parsing table for structural information and annotation for type information. The AAE representation is extended to include a mapping from schema components, mainly the element types, to states in a parsing table in support of fragment validation. To validate a fragment against a schema type, it is necessary simply to determine the state corresponding to the schema component, and start the validation process from that state. When the process consumes all the input and returns to the state, fragment validation has reached successful completion. Depending on the parsing technique used, an extra token may be needed for each schema element type to drive the process to return to the start state. This approach is more efficient than a general tree representation.

BRIEF DESCRIPTION OF THE DRAWINGS

FIG. 2 is a context-free grammar Extended Backus-Naur Form (EBNF) representation of the element constraint of XML schema example.

FIG. 4 illustrates mapping of the combination of element names and scopes to element types.

DESCRIPTION OF THE PREFERRED EMBODIMENTS

Figure 1:
FIG. 1 is an example of an XML schema.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Referring now to FIG. 1, XML schema definition 100 is shown comprising global element declarations personnel 112 and notes 128. Personnel global element 112 is declared to be a complex type and to have a sequence of sub-elements named employee 114. Employee sub-element 114 is declared to be a complex type and to have semantic constraints 116. Employee sub-element 114 is declared to have sub-elements 118, each with its own syntactical constraints 120. In FIG. 1, sub-elements 114 are comprised of lastname, firstname, and notes, each being of a simple type 124; in this case, string. Employee sub-element 114 is also declared to have several attributes 122, each of a simple type 124. In this example, attributes 122 include serno of type integer, userid of type USERID_TYPE, and department of type string. Unlike type USERID_TYPE, integer and string types are predefined. A definition for type USERID_TYPE is set forth in XML schema definition 100 at 130.

Since a distinction between anonymous and named types only exists in an XML schema and is irrelevant to instances of XML documents conforming to an XML schema, a distinction between anonymous and named types is not considered within the scope of the present invention. In the following figures, global element type notes is denoted by <notes> and is used to convey an anonymous or a named type that has notes as an element name for an instance of the type. One focus of the present invention is on an element type check since the validation of attributes in an instance of an XML document is only possible when a host element type is located. Thus, element constraints are necessary to determine a context-free grammar model. A context-free grammar defines syntax constraints among elements and also specifies how to construct an element from sub-elements using types. For example, an element of personnel 104 is constructed from employee elements 114.

Shown in FIG. 2, is a model of element constraints using a context-free grammar. Converting element constraint information into Extended Backus-Naur Form (EBNF) format is known in the art. Unlike a Document Type Descriptor (DTD), where element names are globally unique, an XML schema can contain common local element names in different contexts having no connection to each other. This is due to the local scope of sub-element types. One element name might have a different element type in various sections of an XML document. Different symbols should be used for the same local element names with different types in the EBNF model. With respect to a local scope, an element type in a particular scope uniquely determines each element name.

Figure 3:
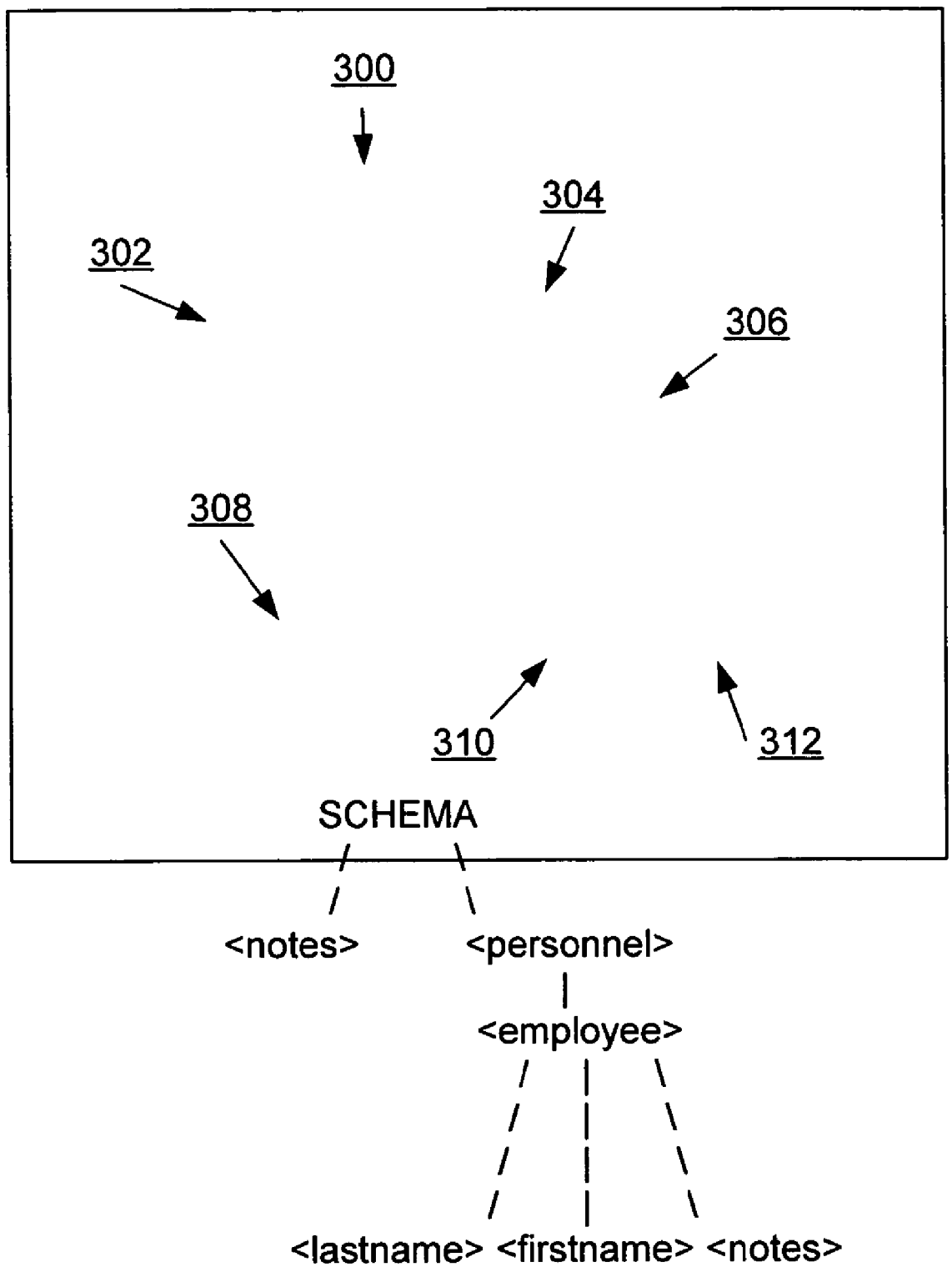
FIG. 3 illustrates the element type hierarchy of XML schema example.

In FIG. 3, type hierarchy information of XML schema definition 100 is shown. In XML schema 300, element types personnel 302 and notes 304 are declared globally. Sub-elements employee 306, lastname 308, firstname 310 are defined via element personnel 302. Of interest is sub-element notes 312, which is also defined under element personnel 302 in addition to its global declaration. A schema context path is necessary to distinguish between a global instance of element notes 304 and a sub-element instance of notes 312 in a validation process.

To validate a document fragment against an element type, an element type is associated with an XML schema context location, specified by an XML schema context path. Shown in FIG. 4 is an XML schema context path 404 consisting of a schema global context 408, 416, as with element personnel 302 and instances of element notes 304 from XML schema definition 100, along with one or more schema context steps 410, 412, 414, 418. For example, a schema context location for element lastname is given by "p:personnel/employee" 412. An element type is unique in a properly specified schema context location. FIG. 4 shows a mapping of element types to a schema context location. It is important to note the child of schema 300 with element type notes 302 has a global scope. The scope of each element type is not necessarily unique; for example, element notes 304 is defined within a global scope as well as within an XML schema context location 418 shown by p:personnel/employee The number of element types in an XML schema is finite. Thus the number of possible start states corresponding to all possible element types in an XML schema is finite and they are predetermined during XML schema compilation. Start states for element types are recorded in a type-mapping table, which is constructed during compilation by a procedure, BUILD_TYPE_MAPPING. At runtime, a type-mapping table lookup is performed to determine a start state corresponding to specific element type tag. After initializing environment variables comprised of a current state, stack, current scanner, and current annotation record, the validation process that follows remains the same as for an entire document. The construction of a type-mapping table is discussed in further detail in following sections.

Figure 5:
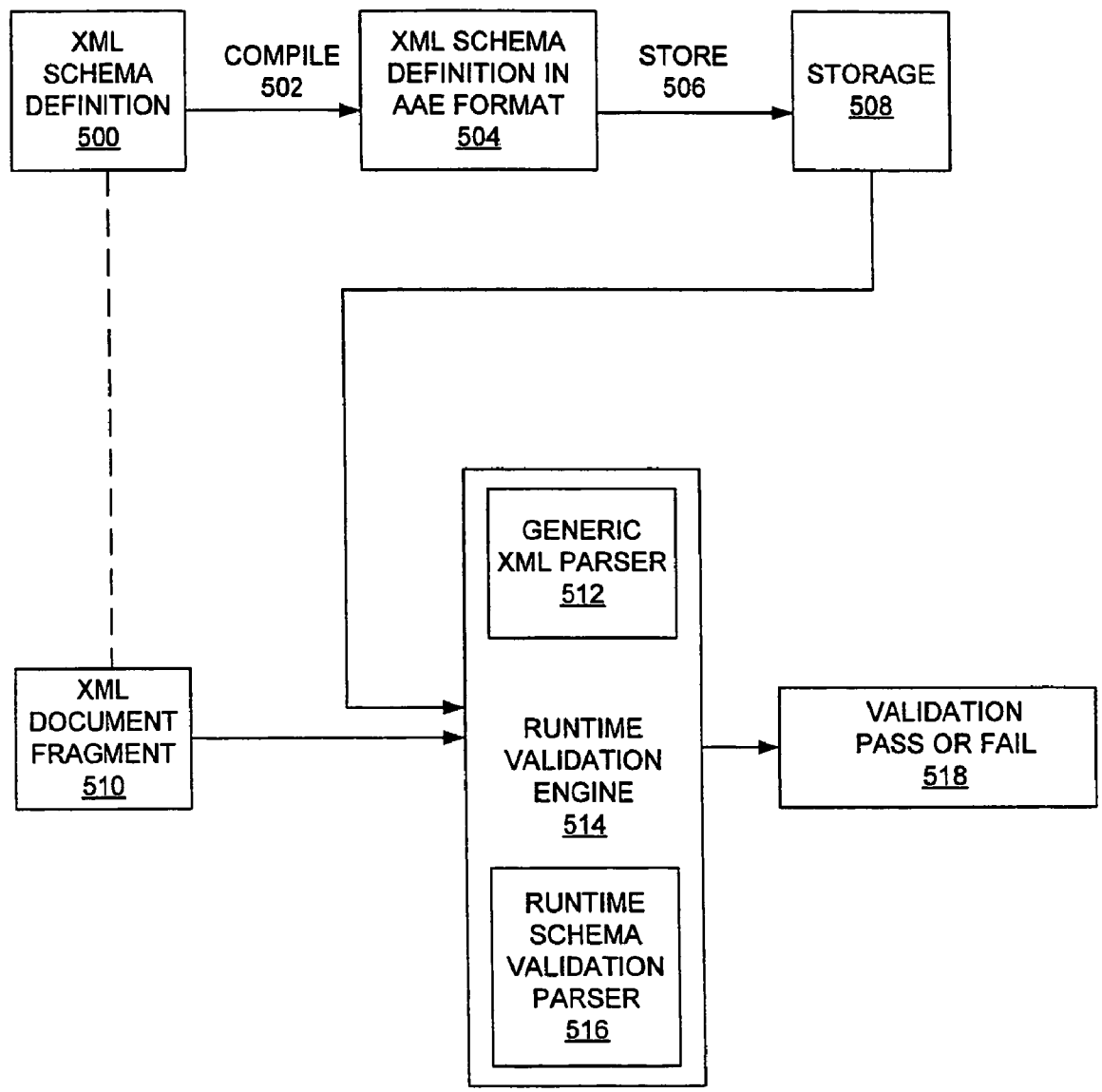
FIG. 5 is a system diagram of the present invention.

Referring now to FIG. 5, the system of the present invention is shown comprising an XML schema definition, a compiler, an XML schema definition in Annotated Automaton Encoding (AAE), an XML document fragment, and a runtime validation engine. The system of the present invention allows a compiler 502 to compile XML schema definitions 500 into an AAE format 504, which are stored in a disk or database 508. The XML schema definitions in AAE format 508 are stored on a disk or in a database 510 for easy retrieval at a later time. The AAE format comprises a parsing table, typically obtained from a parser generator with the addition of annotations. A parser generator uses a traditional parsing technique suitable for an XML schema, including: left-to-right, leftmost derivation, or predictive parsing (LL); left-to-right, rightmost-derivation-in-reverse (LR(0)); simple LR (SLR); or look-ahead-left-to-right (LALR). In one embodiment, a parser generator uses a parsing technique specifically designed for XML schemas that employs a finite state machine with a stack. The difference between each of these parsing techniques is the degree of complexity of implementation and the comparative level of performance. Annotations are the attributes for element nodes and data type constraints for element nodes and their attributes in the XML schema tree created for a particular XML schema definition. Each XML schema definition 500 is compiled once into the AAE format 504. When an XML document fragment 510 is validated, XML document fragment 510 and the appropriate XML schema definition in AAE format 504 are loaded into a runtime validation engine 514. The runtime validation engine 514 comprises a generic XML parser 512 and a runtime schema validation parser 516. The code for the runtime validation engine 514 is fixed and independent of the XML schema definition 500. The generic XML parser 512 performs a low level validation while the runtime schema validation parser 516 performs a high level validation of the XML document fragment 510 against the XML schema definition in AAE format 504. The output of the runtime validation engine is a validation pass or fail 518.

Data in EBNF format is converted into an input format appropriate to a parser generator. Passing converted input data through a parser generator, allows a pushdown automaton parsing table to be determined. Along with type hierarchy annotation information determined from a schema, an annotated automaton encoding for an XML schema can be determined. These steps are discussed in patent application commonly assigned U.S. Ser. No. 60/418,673 referenced in the background section.

Figure 6:
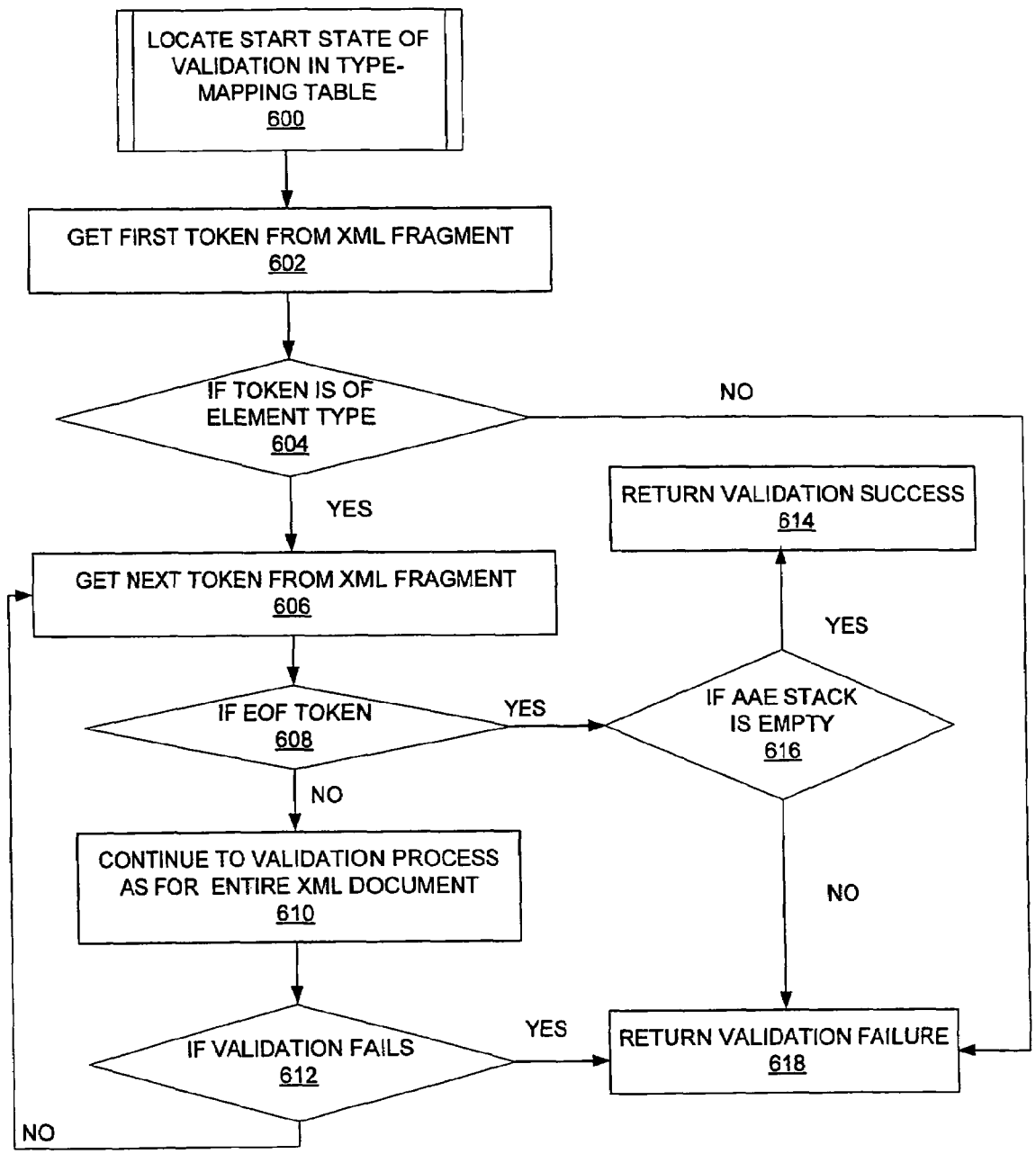
FIG. 6 is a process flow diagram illustrating a validation process for an XML fragment.

Given an XML document fragment, an XML schema AAE, a schema context path, and an element type name; a fragment-validating procedure will first locate a state corresponding to the start of a given XML fragment before continuing to a validation process. Once the validation process is reached, it executes in the same manner as the validation process for an entire document; lexemes are fed into a pushdown automaton and transitions to different states are made. The validation process continues transitioning among states until it returns to the start state. Validation process flow is illustrated in FIG. 6. Validation of a fragment is modeled in the following procedure:

VALIDATE_FRAGMENT (xmlfragment, xmlschemaAAE, schemacontextpath, element_type_name);

FIG. 6 is a flowchart illustrating a preferred embodiment of the runtime validation process performed by the runtime validation engine in accordance with the present invention. With regards to the process of validating an XML document fragment, before a validation procedure can be executed, an XML schema-loading module loads an XML schema in AAE format. Following the loading of an XML schema, an XML document fragment is loaded. A current scanner then tokenizes the loaded XML document fragment.

Referring to FIG. 6, the start state of validation 600 is first located. The start state of validation is located at runtime via a simple table lookup. The construction of the table in which the start state of validation is determined is further described in discussions corresponding to FIGS. 7a-7d. Then, generic XML parser 512 receives a token, via step 602. In the case of a validating process flow for an XML document fragment, generic XML parser 512 checks if a token is returned successfully as the requested element type, via step 604. If the token scan is not successful, then a validation failure is returned, via step 618, and the validation process is terminated. If the token scan is successful, and the generic XML parser 512 gets a next token from an XML document fragment, via step 606. If in step 608 the next token received in step 606 is determined not to be an end of file (EOF) token (i.e., it is an element or attribute token), then the process continues to step 610 where the validation process continues in the same manner as for an entire XML document. If the validation process is determined to continue in step 610, then the token is input into runtime schema validation module 516 as a lexeme. A lexeme takes on one of three types: a start tag name, an attribute name, or an end tag name. Each type of lexeme is processed in a different manner, as discussed in further detail in background references. If the token received in step 606 is not an EOF token, then the process returns to step 606 and repeats until an EOF token is received. If in step 608 the next token received in step 606 is determined to be an end of file EOF token, then it is determined if generic XML parser 512 and the runtime schema validation module 514 are both in accept mode (i.e., when the parsing and validation has completed). In step 616, an AAE is stack is checked for emptiness. If AAE stack is determined to be empty, then the validation of the XML document 512 is successful, via step 614, returning a "valid". If in step 616, it is determined that an AAE stack is not empty, then the validation fails, returning an "invalid" in step 618. If an LR parsing technique is used in the validation module, such as LR(O), SLR, or LALR, a variation of the previously described process is followed when an EOF token is encountered. That is, a FOLLOW token from the type-mapping table for the element type being validated is fed to the validation module in place of an EOF token. The states of both generic XML parser and validation module are then checked for success. During parsing table generation, a FOLLOW set is determined for each non-terminal type in an XML schema. A FOLLOW set is comprised of tokens representing element type tags. Any token from a FOLLOW set can be recorded in an annotation record, or placed in a type-mapping table.

In FIGS. 7a-7d, process flow diagrams for the construction of type-mapping table are shown. In step 700 of FIG. 7a, a type-mapping table is built using an AAE, which is comprised of an annotation hierarchy and an automaton encoding (parsing table) which is provided as input in step 702. In step 704, for each global element type, i.e. a child type, C, of SCHEMA (XML schema root), the following process occurs. If in step 706, a determination is made as to the completion of the process for all the global types, the process continues with step 714. Otherwise, the process continues with 708, where a start token from an annotation record for type C is given to an element validation module. When the process continues to step 710, an entry in a type-mapping table for type C is created. The entry consists of a record containing epsilon, the element type name of type C, an annotation record of type C, and a current state taken from a parsing table. Continuing with step 712, an element validation module is reset. If in step 706, the process is determined to have reached completion, the process continues to step 714. In step 714, data structures temp_stack and token_array are initialized, and variable index_of_last_token is set to zero. In step 716, for each global element type C; the traverse_subtree procedure is called to traverse all types under each global element type C and build entries in a type-mapping table. The traverse_subtree procedure takes as input global element type C, token_array, and index_of_last_token variable.

Figure 7A:
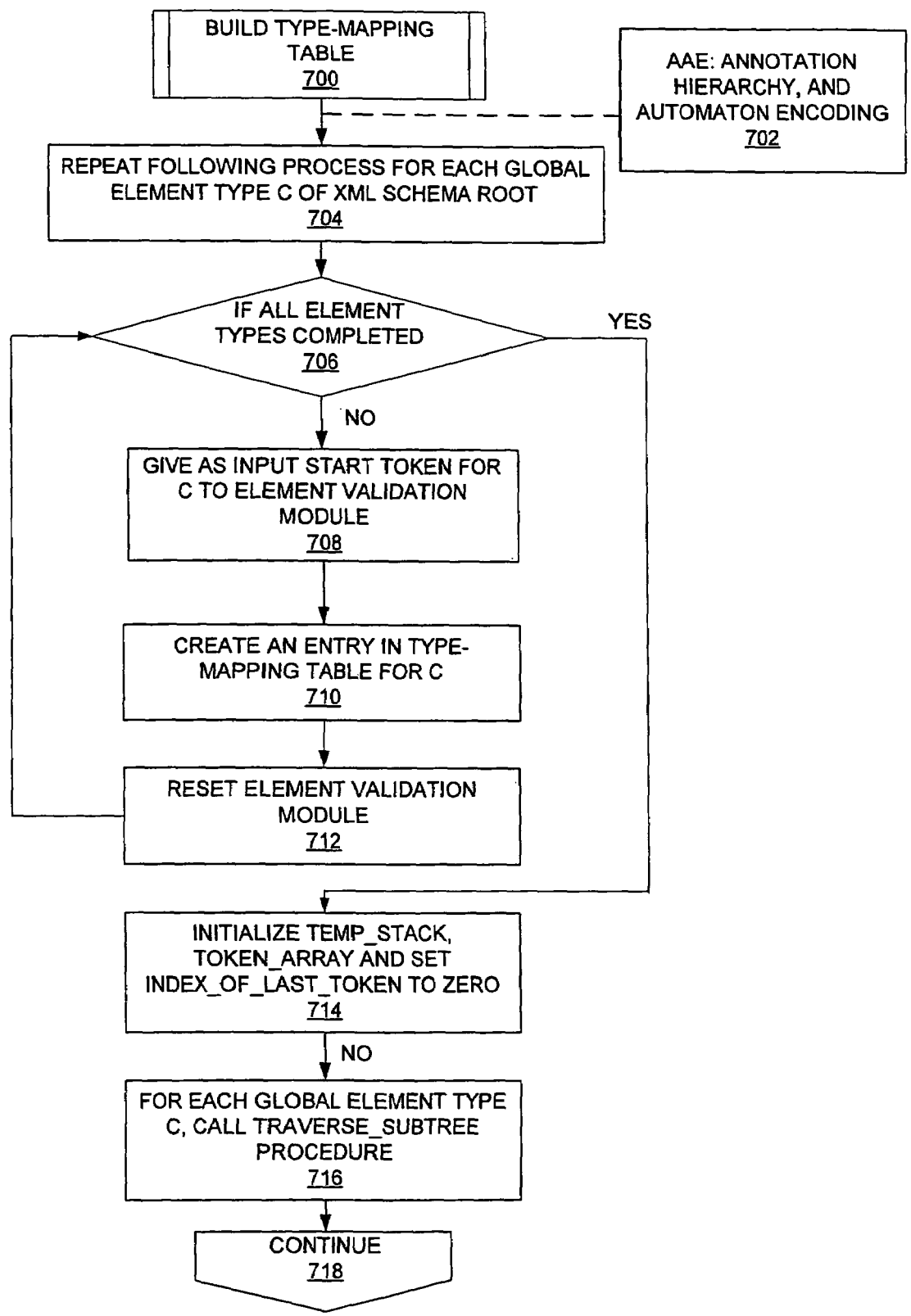
FIG. 7(a) is a process flow diagram for constructing a type-mapping table.
Figure 7B:
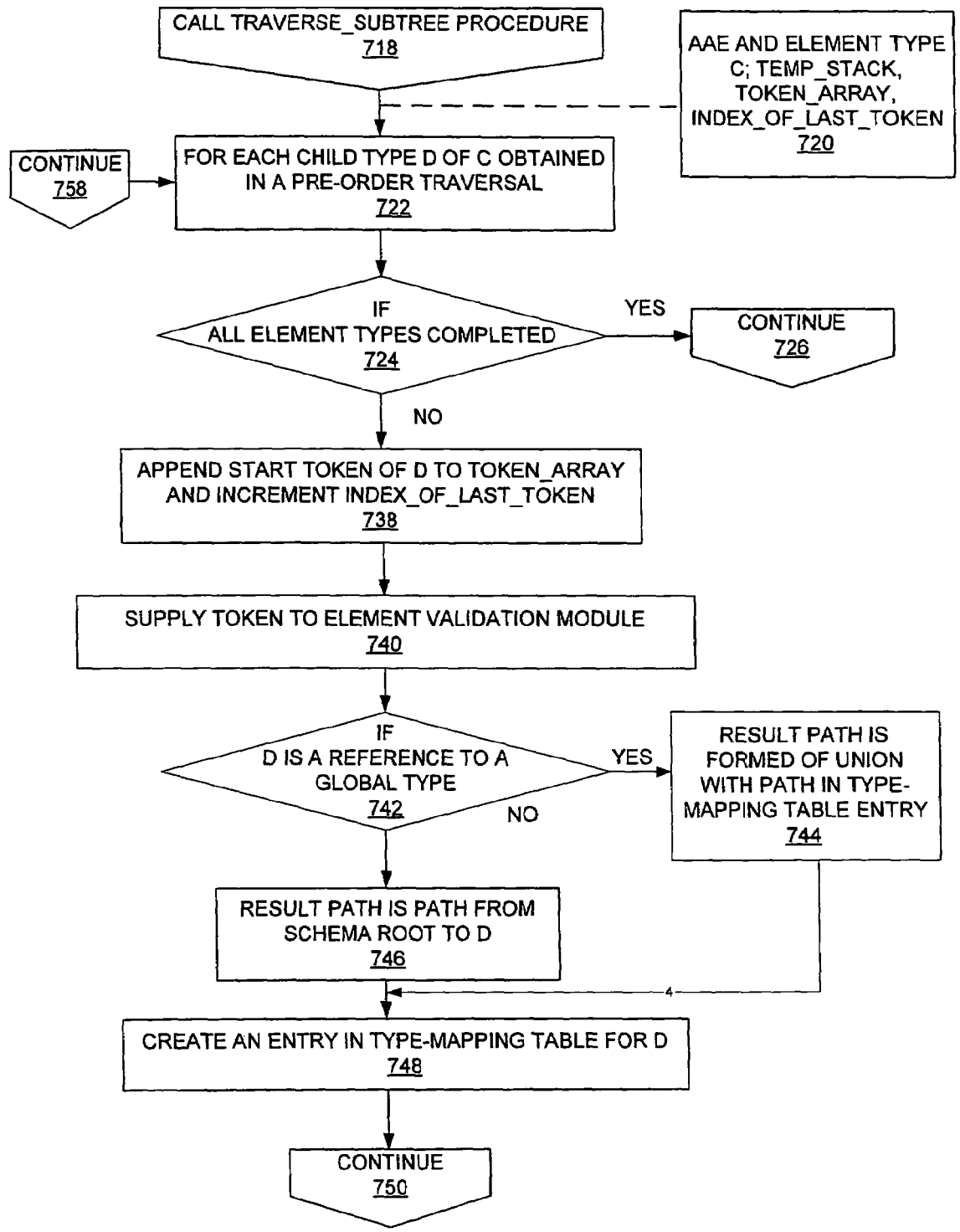
FIG. 7(b) is a continuation of the process flow diagram for constructing a type-mapping table.

In FIG. 7b, the process continues with step 718 in which the traverse_subtree procedure is called. Provided as further input to the procedure are an AAE, an element type C, and data structures temp_stack, token_array, and variable index_of_last_token from step 720. In step 722, for each child type D of element type C in pre-order (i.e. the list order) according to annotation hierarchy, if the process is determined in step 724 not to be finished, the process continues with step 738. In step 738, a start token of element type D is appended to token_array, and the index_of_last_token is incremented accordingly. As an alternative to getting a token from a FOLLOW set, the appended token becomes an extra token needed for a previous element type. In step 740, a start token is fed to the element validation module. In step 742, if element type D is determined to be a reference to a global type, the process continues to step 744. In step 744, a result path is determined by taking the union of the path from a root to element type D with the path in the type-mapping table for the referenced global type. If in step 742, element type D is determined not to reference a global type, the process continues to step 746, where a result path is determined as the path from a root to element type D. The process continues to step 748, where an entry is created in a type-mapping table for element type D. An entry contains a result path for D, an element type name of D, an annotation record of D, and a current state from a parsing table. The process continues with step 750.

Figure 7C:
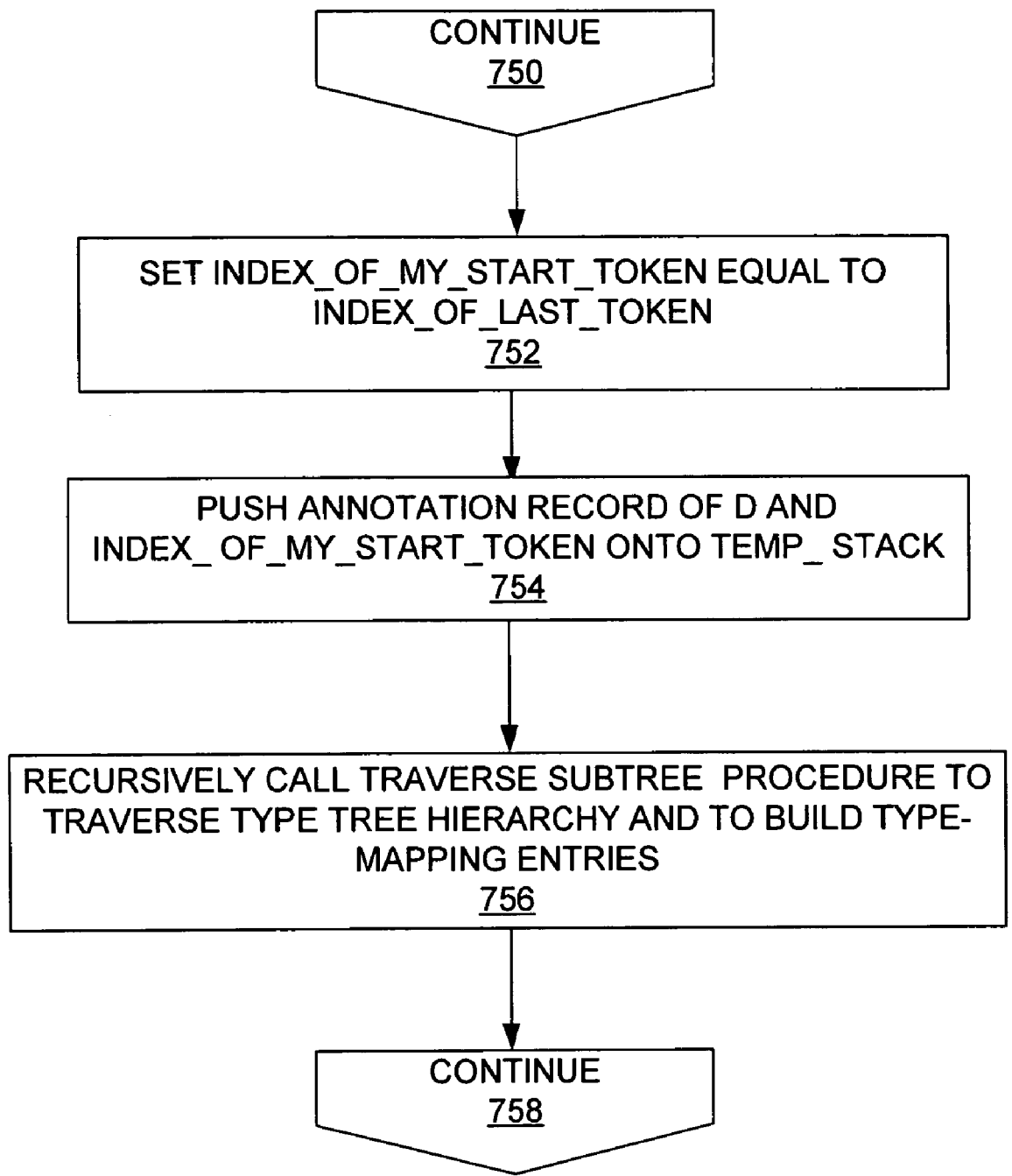
FIG. 7(c) is a continuation of the process flow diagram for constructing a type-mapping table.

In FIG. 7c, the process of building a type-mapping table continues with step 750. In step 752, an index_of_my_start_token variable is set to the index_of_last_token. In step 754, an annotation record of D and index_of_my_start_token is pushed onto a temp_stack. In step 756, a traverse_subtree procedure is recursively called to traverse and build type-mapping entries for all child element types. The process continues with step 758 in FIG. 7b. In step 758, the process returns to continue for each child type D of element type C. If in step 724, it is determined that the process has completed for all child types D of C, the process continues with step 726.

Figure 7D:
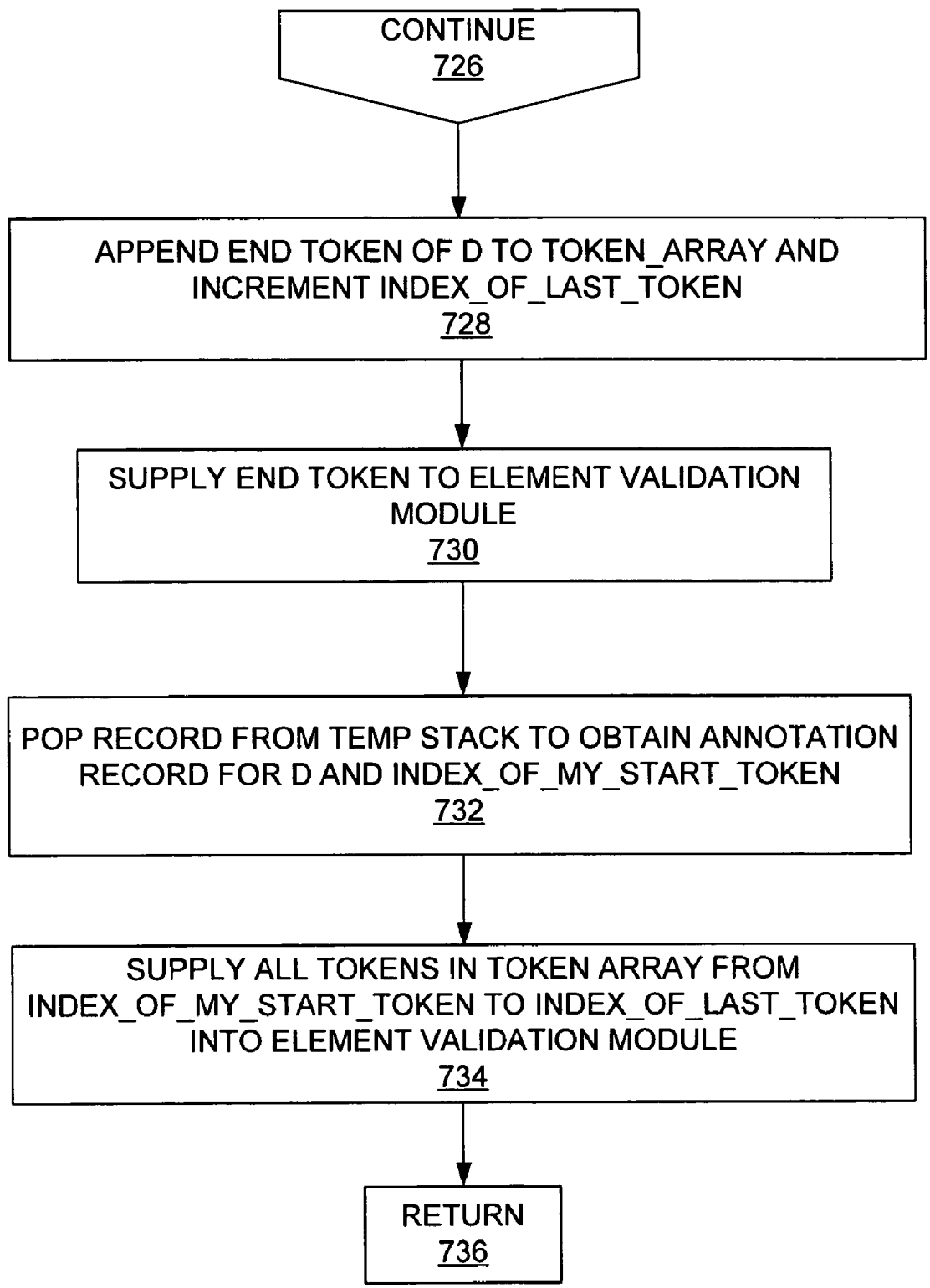
FIG. 7(d) is a continuation of the process flow diagram for constructing a type-mapping table.

In FIG. 7d, the process of building a type-mapping table continues with step 726. In step 728, an end token of element type D is appended to token_array and index_of_last_token is incremented accordingly. The appended token becomes the extra token needed for a previous element type. In step 730, an end token from step 728 is fed to an element validation module. The process then continues to step 732, where a record is popped off temp_stack to get an annotation record of D along with index_of_my_start_token. In step 734, all tokens from index_of_my_start_token to index_of_last_token are fed into an element validation module. In step 736, the process returns.

Figure 8:
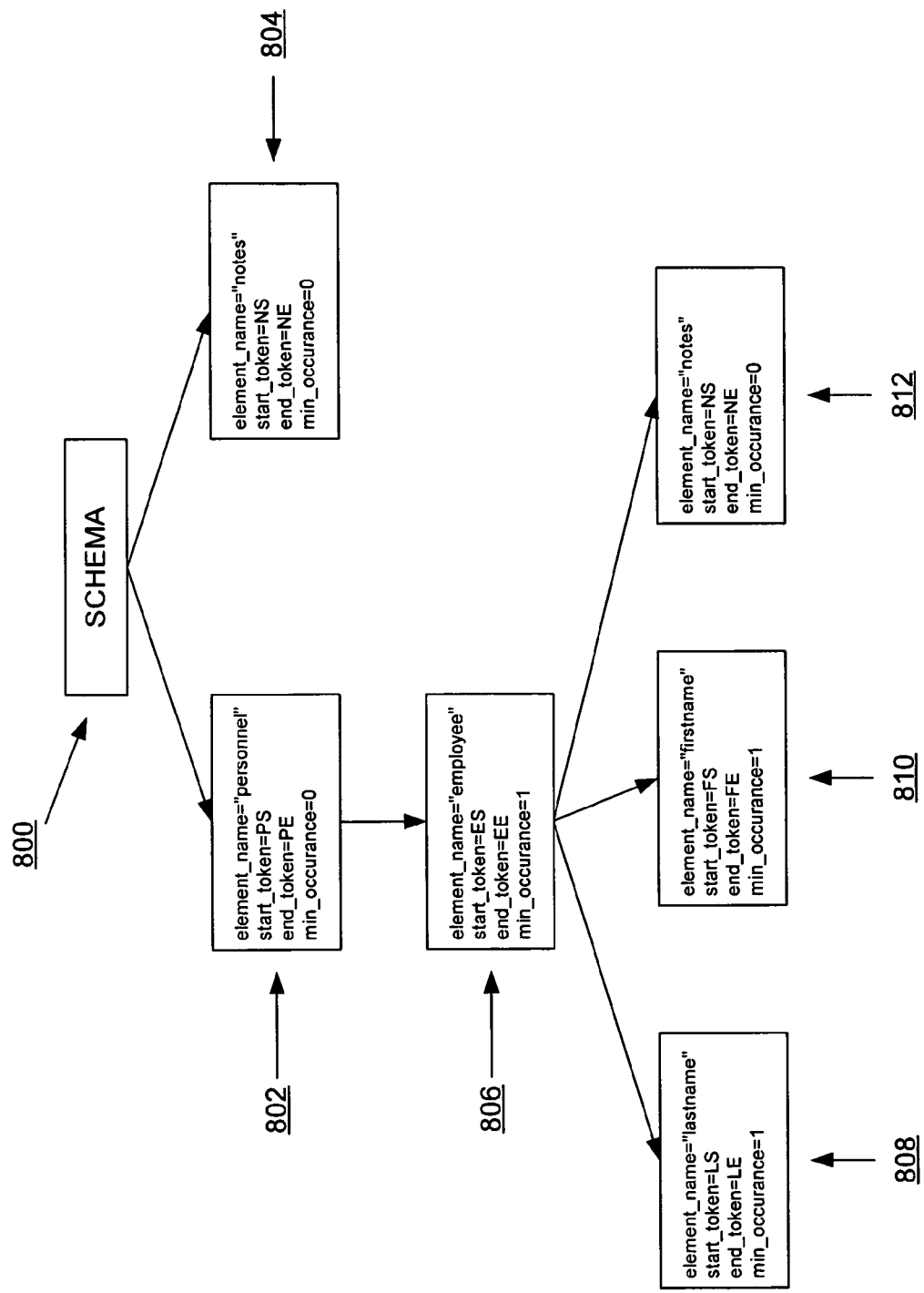
FIG. 8 is an exemplary document XML schema.

In FIG. 8, an exemplary type hierarchy tree built from an XML schema is shown. Each node in a type hierarchy ordered tree contains the same type information as the annotation records referred to in, for example, 60/418,673. For clarity, attribute annotation is omitted in this figure. Element types of schema 800 are comprised of global element types 802 and 804, as well as child types 806, 808, 810, and 812. Minimum occurrence information for each element type is also added to each node. A type hierarchy ordered tree facilitates the process of building a type-mapping table as described in discussion corresponding to FIGS. 7a-7d; type-mapping table entries are determined by element types in a type hierarchy ordered tree.

Figure 9:
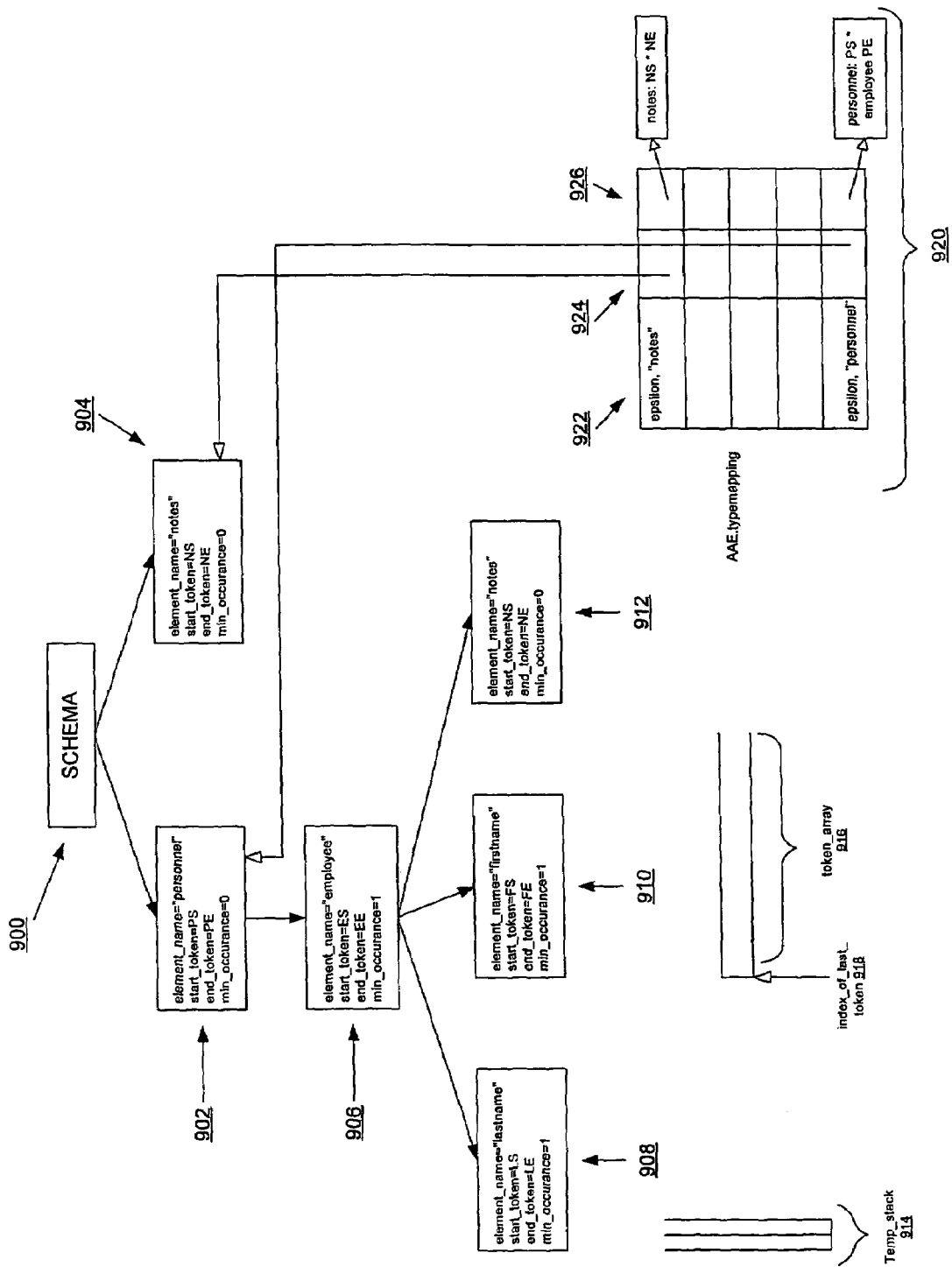
FIG. 9 illustrates initial setup of data structures and environment variables within an annotated automaton encoding for the exemplary XML schema.

Shown in FIG. 9 are AAE type-mapping table 920 and data structures 914, 916, and 918 as they appear after step 710 of the process of building a type-mapping table as described in discussion corresponding to FIG. 7a has been executed. Data structures are comprised of temp_stack 914, token_array 916, and index_of_last_token 918. AAE type-mapping table 920 is first populated with entries for global element types personnel 902 and notes 904. The entry consists of a record containing epsilon, the element type name of global element type, an annotation record of global element type, and a current state from a parsing table. AAE type-mapping table 920 further contains fields designating element type 922 pointers to element types 924 found in schema 900 and annotation record 926.

Figure 10:
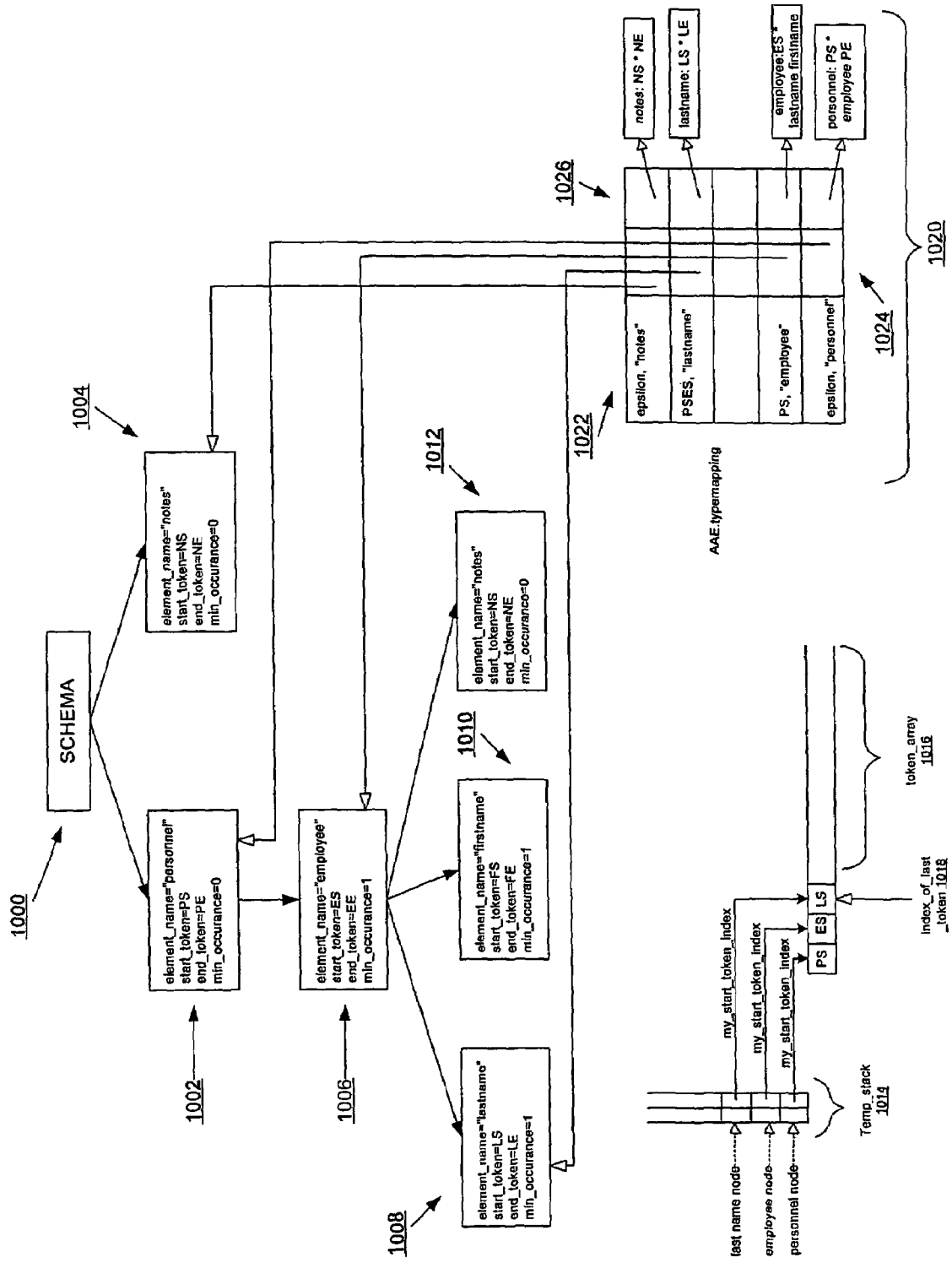
FIG. 10 illustrates a state of annotated automaton encoding data structures and environment variables for the exemplary XML schema after type-mapping entries are entered into type-mapping table.

Shown in FIG. 10 are AAE type-mapping table 1020 and data structures 1014, 1016, and 1018 as they appear after step 748 of the process of building a type-mapping table as described in discussion corresponding to FIG. 7b has been executed. By traversing type hierarchy ordered tree, type-mapping table entries are created for non-global employee element type and non-global lastname element type. In this stage of the process, all unique type-mapping entries have been entered into AAE type-mapping table 1020.

Figure 11:
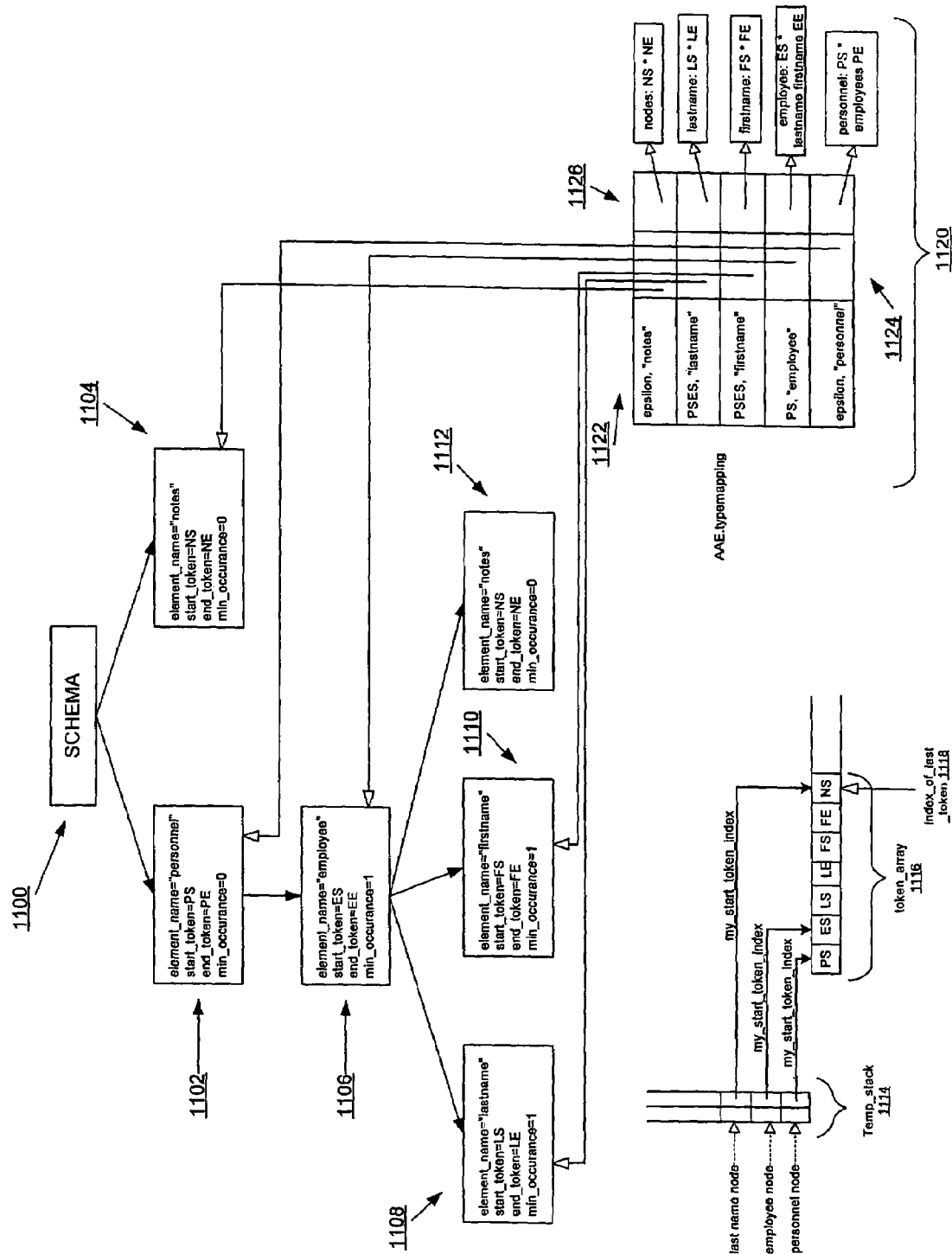
FIG. 11 illustrates a state of annotated automaton encoding data structures and environment variables for the exemplary XML schema after all type-mapping entries are entered into type-mapping table.

Shown in FIG. 11 are AAE type-mapping table 1120 and data structures 1114, 1116, and 1118 after the entries for all elements in a schema 1100 are created. Note that type-mapping entry of element type notes has been modified to reflect its reference to a previous element type definition 1104.

The LOCATE_START_STATE procedure takes as input an AAE of an XML schema, an XML schema context path to a specified XML context location, and the element type name to validate against in context. Locating a start state is modeled in the following procedure.

---

LOCATE_START_STATE (xmlschemaAAE, schemacontextpath, element_type_name)

---

The procedure searches type-mapping entries in a type-mapping table to find a match to the input schemacontextpath and element_type_name. Based upon a retrieved entry, a corresponding annotation record and validation process start state are then used to establish an initial environment for a runtime validation module.

Because type-mapping entries for a type-mapping table are determined at compile time, a type tree hierarchy is traversed to supply each element type. Since XML schema recommendation (the W3C standard) specifies that element structural constraints of XML schema be validated without look-ahead, EBNF for an XML schema belongs to LR(O) grammar, which can also be validated by the predictive parsing technique. In present invention, an LALR parser generator technique to convert EBNF grammars to pushdown automata is assumed. An LALR parser generator is replaceable by a predictive parser generator. Predictive parsing is well known in the art, and does not necessitate the use of an extra token when an EOF token is encountered. Predictive parsing can also be used for both XML document and fragment validation. Depending on the parsing technique chosen, a parsing table, state transition table, or finite state machine is determined. In a parsing table for a predictive parser, there is only one entry corresponding to each non-terminal element type (i.e., each type in an XML schema or some assistant non-terminal). The LOCATE_START_STATE procedure works by using a type-mapping table. In fact, each entry in a type-mapping table is a state for automaton for a predictive parser. For a detailed discussion of the use of such a data structure to parse an XML document or fragment, please refer to U.S. Ser. No. 60/418, 673.

Additionally, the present invention provides for an article of manufacture comprising computer readable program code contained within implementing one or more modules to parse and validate XML document fragments against a chosen element type. Furthermore, the present invention includes a computer program code-based product, which is a storage medium having program code stored therein which can be used to instruct a computer to perform any of the methods associated with the present invention. The computer storage medium includes any of, but is not limited to, the following:

CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, or any other appropriate static or dynamic memory or data storage devices. Implemented in computer program code based products are software modules for: (a) parsing an XML document fragment to return a token; and (b) validating an XML document fragment.

CONCLUSION

A system and method has been shown in the above embodiments for the effective implementation of an efficient XML schema validation of XML fragments using annotated automaton encoding (AAE). While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program.

The above enhancements are implemented in various computing environments. For example, the present invention may be implemented on a conventional IBM PC or equivalent. All programming and data related thereto are stored in computer memory, static or dynamic, and may be retrieved by the user in any of: conventional computer storage, display (i.e., CRT) and/or hardcopy (i.e., printed) formats. The programming of the present invention may be implemented by one of skill in the art of object-oriented programming.

The invention claimed is:

1. A system to validate a fragment of a structured document, said system comprising computer storage storing computer readable program code, which when executed by a processor, implements:
   a generic parser to perform a low level validation;
   a schema validation parser to perform a high level validation;
   a schema-loading module loading a fragment associated with a structured document from a schema in annotated automaton encoding format;
   a scanner tokenizing said loaded fragment;
   a run-time validation engine receiving output of said scanner and outputting a validation pass message based on an LR parsing technique as follows:
      obtaining a first token from said fragment of said structured document,
      determining whether said first token is of element type said fragment of said structured document that is to be validated against, and if so,
      obtaining next token from said fragment of said structured document,
      checking whether said next token signifies end of said fragment of said structured document, and if so,
         identifying a FOLLOW token from a type-mapping table for said element type;
         based on said FOLLOW token, performing a low level validation using said generic parser and performing a high level validation using said schema validation parser; and
         returning a validation pass if both validations of said generic parser and schema validation parser are successful and an annotated automaton encoding stack is empty; and
      if said next token does not signify end of said fragment of said structured document, continuing validation as in validating an entire structured document, and when successfully validated as in an entire structured document, returning to step (iii) until end of said structured document token is received and outputting a validation pass when said annotated automaton encoding stack is empty.

2. The system of claim 1, wherein said structured document is an XML document.

3. The system of claim 1, wherein said first or next token is either an element type name or an attribute name.

4. The system of claim 1, wherein said first or next token is a lexeme, said lexeme being any of the following: a start tag name, an attribute name, or an end tag name.

5. The system of claim 1, wherein said computer-based method is implemented in conjunction with a database.

6. A computer program product comprising:
   a computer usable medium having computer usable program code for validating an XML fragment, said computer program product including:
   computer usable program code implementing a generic parser to perform a low level validation;
   computer usable program code implementing a schema validation parser to perform a high level validation;
   computer usable program code implementing a schema-loading module loading a fragment associated with a structured document from a schema in annotated automaton encoding format;
   computer usable program code implementing a scanner tokenizing said loaded fragment;
   computer usable program code implementing a run-time validation engine receiving output of said scanner and outputting a validation pass message based on an LR parsing technique as follows:
      obtaining a first token from said fragment of said structured document,
      determining whether said first token is of element type said fragment of said structured document that is to be validated against, and if so,
      obtaining next token from said fragment of said structured document,
      checking whether said next token signifies end of said fragment of said structured document, and if so,
         identifying a FOLLOW token from a type-mapping table for said element type;
         based on said FOLLOW token, performing a low level validation using said generic parser and performing a high level validation using said schema validation parser; and
         returning a validation pass if both validations of said generic parser and schema validation parser are successful and an annotated automaton encoding stack is empty; and
      if said next token does not signify end of said fragment of said structured document, continuing validation as in validating an entire structured document, and when successfully validated as in an entire structured document, returning to step (iii) until end of said structured document token is received and outputting a validation pass when said annotated automaton encoding stack is empty.

7. The computer program product of claim 6, wherein said structured document is an XML document.

8. The computer program product of claim 6, wherein said first or next token is either an element type name or an attribute name.

9. The computer program product of claim 6, wherein said first or next token is a lexeme, said lexeme being any of the following: a start tag name, an attribute name, or an end tag name.

10. The computer program product of claim 6, wherein said computer-based method is implemented in conjunction with a database.

* * * * *